United States Patent
Weragoda Vidanelage (10) Patent No.: US 11,137,094 B2
(45) Date of Patent: Oct. 5, 2021

(54) CLIP END DEVICE

(71) Applicant: Reliance Worldwide Corporation, Atlanta, GA (US)

(72) Inventor: Thimuthu Weragoda Vidanelage, Atlanta, GA (US)

(73) Assignee: RELIANCE WORLD WIDE CORPORATION, Atlanta, GA (US)

( * ) Notice: Subject to any disclaimer, the term of this patent is extended or adjusted under 35 U.S.C. 154(b) by 435 days.

(21) Appl. No.: 15/960,339

(22) Filed: Apr. 23, 2018

(65) Prior Publication Data

US 2019/0323639 A1 Oct. 24, 2019

(51) Int. Cl.
*F16L 21/08* (2006.01)
*F16L 21/02* (2006.01)

(52) U.S. Cl.
CPC .............. *F16L 21/08* (2013.01); *F16L 21/02* (2013.01)

(58) Field of Classification Search
CPC ... F16L 37/0885; F16L 37/142; F16L 37/144; F16B 21/186
See application file for complete search history.

(56) References Cited

U.S. PATENT DOCUMENTS

| | | | |
|---|---|---|---|
| 2,913,261 A | 11/1959 | Matchett | |
| 4,007,953 A * | 2/1977 | Powell | H01R 13/621 285/321 |
| 4,471,978 A * | 9/1984 | Kramer | B60T 17/04 285/136.1 |
| 4,763,470 A | 8/1988 | Brown | |
| 5,341,773 A * | 8/1994 | Schulte | F02D 9/105 123/184.61 |
| 6,371,528 B1 * | 4/2002 | Kimura | F16L 41/007 285/305 |
| 6,568,713 B1 * | 5/2003 | Bruvry | F16L 37/144 285/133.21 |
| 6,983,958 B2 * | 1/2006 | Rautureau | F16L 37/144 285/305 |
| 7,044,505 B2 * | 5/2006 | Takayanagi | F16L 37/0987 285/319 |

(Continued)

OTHER PUBLICATIONS

International Search Report and Written Opinion issued in International Appl. Ser. No. PCT/US2019/028546 dated Oct. 3, 2019 (11 Pages).

(Continued)

*Primary Examiner* — Jacob J Cigna
*Assistant Examiner* — Michael W Hotchkiss
(74) *Attorney, Agent, or Firm* — Foley & Lardner LLP (57) ABSTRACT

A fitting includes at least one port permitting flow of fluid and a connector body to which the port is attached. The connector body has a first mating portion. The fitting additionally includes a retainer structured to engage with the connector body and having a first tapered terminal portion and a second tapered terminal portion opposed to the first tapered terminal portion. The fitting further includes a tubular member configured to be fitted into the connector body and having a second mating portion structured to receive terminal portions of the retainer and configured to align with the first mating portion, and a seal positioned within the tubular member and disposed to be flush against an inner surface of the connector body.

18 Claims, 6 Drawing Sheets

(56) References Cited

U.S. PATENT DOCUMENTS

| | | | | |
|---|---|---|---|---|
| 7,387,318 B2* | 6/2008 | Yoshida | F01P 11/04 | 285/321 |
| 7,393,019 B2* | 7/2008 | Taga | F16L 33/227 | 285/321 |
| 7,438,328 B2* | 10/2008 | Mori | F16L 37/0885 | 285/305 |
| 7,497,478 B2* | 3/2009 | Callahan | F02M 35/10137 | 285/305 |
| 7,527,303 B2* | 5/2009 | Furuya | F16L 37/1225 | 285/305 |
| 8,267,435 B2* | 9/2012 | Hellfeier | F16L 37/06 | 285/321 |
| 8,297,659 B2* | 10/2012 | Callahan | F16L 37/144 | 285/93 |
| 8,336,919 B2* | 12/2012 | Gillet | F16L 37/144 | 285/93 |
| 8,876,170 B2 | 11/2014 | Williams et al. | | |
| 9,016,729 B2* | 4/2015 | Ishida | F16L 37/0885 | 285/321 |
| 9,188,267 B2* | 11/2015 | Fansler | F16L 37/0885 | |
| 9,506,592 B2* | 11/2016 | Turnau, III | F16L 37/144 | |
| 9,657,878 B2* | 5/2017 | Hartmann | F16L 37/0885 | |
| 10,047,889 B2* | 8/2018 | Chaupin | F16L 37/144 | |
| 10,151,412 B2* | 12/2018 | Bassaco | F16L 37/0885 | |
| 10,569,644 B2* | 2/2020 | Mitsuhashi | F02M 37/00 | |
| 2003/0137148 A1* | 7/2003 | Andre | F16L 37/144 | 285/305 |
| 2003/0160448 A1* | 8/2003 | Takayanagi | F16L 37/098 | 285/305 |
| 2004/0183301 A1* | 9/2004 | Yoshida | B29C 66/322 | 285/305 |
| 2004/0194834 A1 | 10/2004 | Rehder et al. | | |
| 2008/0136163 A1* | 6/2008 | Okada | F16L 37/0987 | 285/2 |
| 2008/0279621 A1* | 11/2008 | Chaupin | F16L 37/144 | 403/345 |
| 2010/0287740 A1* | 11/2010 | Rigollet | F16L 33/03 | 24/270 |
| 2011/0227337 A1 | 9/2011 | Kattler et al. | | |
| 2012/0211977 A1* | 8/2012 | Callahan | F16L 37/144 | 285/313 |
| 2013/0009393 A1* | 1/2013 | Hartmann | F16L 13/147 | 285/45 |
| 2013/0082459 A1* | 4/2013 | Kaneko | F16L 37/144 | 285/93 |
| 2015/0167880 A1* | 6/2015 | An | F16L 37/0885 | 285/400 |
| 2015/0323109 A1 | 11/2015 | Dupal et al. | | |
| 2016/0069496 A1* | 3/2016 | Tayama | F16L 21/08 | 285/374 |
| 2017/0146173 A1* | 5/2017 | Chaupin | F16L 37/1225 | |
| 2018/0051838 A1* | 2/2018 | Hamon | F16L 23/18 | |

OTHER PUBLICATIONS

International Preliminary Report on Patentability on PCT Appl. Ser. No. PCT/US2019/028546 dated Nov. 5, 2020 (7 pages).

* cited by examiner

CLIP END DEVICE

FIELD

The present application relates generally to the field of fittings for residential and commercial plumbing systems.

BACKGROUND

Multiport pipe fittings (also known as "multiport tees" or "manifolds") are used in plumbing systems in both residential and commercial applications. Multiport pipe fittings typically include a plurality of ports which are all spaced along a side of the fitting. In some instances, a first group of ports are spaced along a first side of the fitting, and a second group of ports are spaced along a second side of the fitting. Such fittings are typically formed as a single integral body. The ports on each side may all be oriented in a same direction.

The foregoing fittings are constrained in terms of where and how they can be employed. For example, fittings which have ports all oriented in the same direction are not suitable for configurations where the ports must be in different directions. Further, such fittings are limited to a fixed number of ports.

SUMMARY

According to an exemplary aspect, a fitting includes at least one port permitting flow of fluid and a connector body to which the port is attached. The connector body has a first mating portion. The fitting additionally includes a retainer structured to engage with the connector body and having a first tapered terminal portion and a second tapered terminal portion opposed to the first tapered terminal portion. The fitting further includes a tubular member configured to be fitted into the connector body and having a second mating portion structured to receive terminal portions of the retainer and configured to align with the first mating portion, and a seal positioned within the tubular member and disposed to be flush against an inner surface of the connector body.

According to another exemplary aspect, a method of assembling a manifold includes positioning a retainer to engage with a body of a manifold such that the retainer circumscribes at least a part of a cylindrical end of the body, and inserting a fitting into the body, the body having a groove and first and second tabs spaced from the seal in a lateral direction of the body. The method further includes arranging the retainer in the groove, the retainer having a tapered first terminal portion and a tapered second terminal portion which respectively contact the first and second tabs, the retainer being flush with the fitting, and preventing axial motion of the fitting when the retainer is inserted into the groove.

According to a further exemplary aspect, a water distribution manifold system includes one or more modular sections culminating in at least one port. Each of the modular sections includes a body portion configured to guide fluid to the respective port and having a receptacle, and a retainer structured to engage with the body portion and having a first end and a second end encircling at least part of the body portion. The modular sections further include a tubular portion configured to fit into the body portion and having a protrusion configured to mate with the receptacle of the body portion.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims. In the drawings, like reference numerals are used throughout the various views to designate like components.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Various exemplary implementations are described hereinafter. It should be noted that the specific implementations are not intended as an exhaustive description or as a limitation to the broader aspects discussed herein. One aspect described in conjunction with a particular implementation is not necessarily limited to that implementation and can be practiced with any other implementation(s).

The following terms are used throughout and are as defined below.

As used herein and in the appended claims, singular articles such as "a" and "an" and "the" and similar references in the context of describing the elements (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate the implementations and does not pose a limitation on the scope of the claims unless otherwise stated. No language in the specification should be construed as indicating any non-claimed element as essential.

The implementations, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of will be understood to include those elements specifically recited and those additional elements that do not materially affect the basic and novel characteristics of the claimed technology. The phrase" consisting of excludes any element not specified. The expression "comprising" means "including, but not limited to." Thus, other non-mentioned components or steps may be present. Unless otherwise specified, "a" or "an" means one or more.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation indicates approximations which may vary by (+) or (−) 10%, 5% or 1%, for example.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Figure 1:
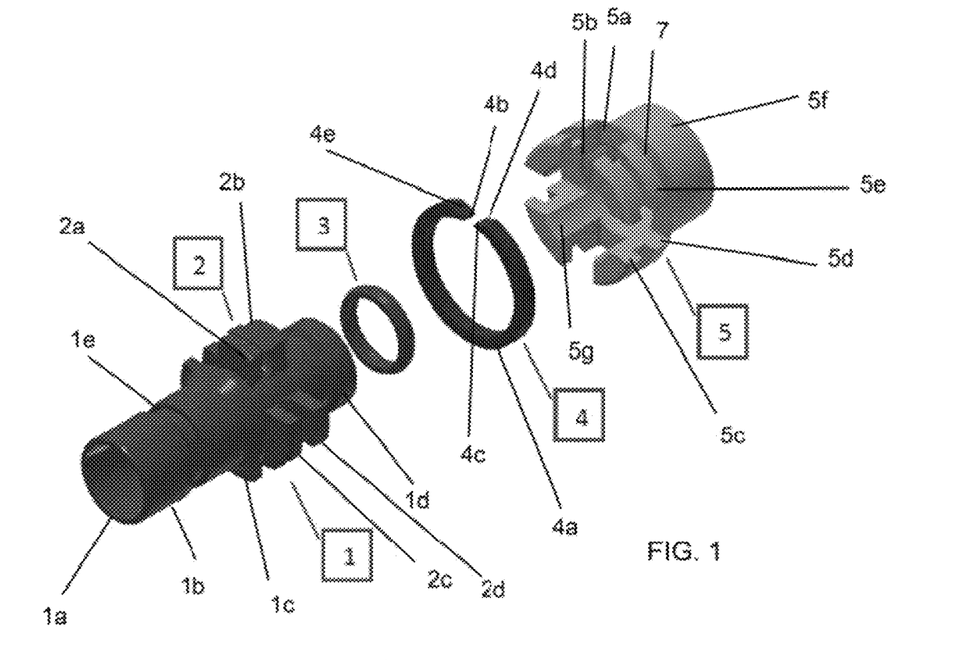
FIG. 1 is an exploded view of a system according to an exemplary implementation.

Referring to FIG. 1, an exploded view of a system according to an exemplary implementation is shown. The system includes a fitting 1, mating tabs 2, a sealing member 3, a retainer 4, and a body 5. These components are discussed in more detail below. The system shown in FIG. 1 is dimensioned to conform to a ¾" Copper Tube Size (CTS), according to at least one implementation, although it is not limited to such sizing. Further, the system shown in FIG. 1 may be employed as a 1" multiport tee, but is not limited to such sizing. The fitting 1 may be assembled with bodies of varying sizes.

The fitting 1 may be constructed from cross-linked high-density polyethylene (PEX) material, although it is not limited to such material. In at least one implementation, the fitting 1 is constructed from EvoPEX™ made by Reliance Worldwide Corporation of Atlanta, Ga. Furthermore, the fitting 1 and other components of the system satisfy applicable requirements for plumbing applications including both water (e.g., potable and/or non-potable water) and other fluids such as glycol (up to 100% mix) in hot and cold fluid systems. The fitting may be provided with one or more ports permitting flow of fluid.

The fitting 1 is a tubular member which includes a fitting opening at a first end 1a, which is formed as a circular opening. The fitting opening is provided at an end of a cylindrical member 1b which is positioned such that a shorter axis thereof corresponds to the diameter of the first end 1a. The cylindrical member 1b interfaces, at another end thereof, with a narrow portion 1e having a reduced diameter relative to the cylindrical member 1b. A second end 1d of the fitting 1 is positioned such that the cylindrical member 1b and the narrow portion 1e are between the first end 1a and the second end 1d. A ridge member 1c is disposed between the narrow portion 1e and the second end 1d. The ridge portion 1c is formed with protruding portions that extend beyond the outer circumference of the cylindrical member 1b.

The fitting 1 is further provided with one or more mating tabs 2. The mating tabs 2 of the fitting are formed as generally oblong structures which protrude from the outermost surface of the fitting 1 in one or more directions. The mating tabs 2 are protrusions that project from a top of the fitting 1 and from one or more sides. A width of the mating tab 2 may be greater than a radius of the first end 1a of the fitting 1, and a height of the mating tab 2 may be less than the radius of the first end 1a.

The exemplary implementation shown in FIG. 1 includes a first mating tab 2a adjacent to a second mating tab 2b, and a third mating tab 2c adjacent to a fourth mating tab 2d. The first and second mating tabs 2a, 2b and the third and fourth mating tabs 2c, 2d are arranged as pairs each having a predetermined spacing between respective tabs of the pairs. The first and second mating tabs 2a, 2b are disposed on an upper surface of fitting 1, whereas the third and fourth mating tabs 2c, 2d are disposed laterally, on a side of the fitting 1 and orthogonal to the first and second mating tabs 2a, 2b. The first tab 2a is at an approximate right angle to the third tab 2c, and the second tab 2b is at an approximate right angle to the fourth tab 2d. Although not shown, an additional pair of mating tabs (e.g., a fifth mating tab and a sixth mating tab) may be provided on an opposite side of the fitting 1 and orthogonal to the first and mating tabs 2a, 2b.

The aforementioned mating tabs 2a-2d are positioned on a portion of the fitting 1 between the ridge portion 1c and the second end of the fitting 1d. The mating tabs 2a-2b are protruded from a portion of the fitting 1 that is equivalent in diameter to the cylindrical portion 1b. Accordingly, the diameter of the second end 1d of the fitting 1 is approximately equivalent to the diameter of the first end 1a.

Referring again to FIG. 1, a sealing member 3 is depicted between the fitting 1 and the retainer 4, which is discussed below. The sealing member 3 is dimensioned to fit within the second end 1d of the fitting 1, such that the diameter of the second end 1d is larger than the sealing member 3 when compressed within the fitting 1. The sealing member 3 is a polymer seal which inhibits leakage of fluid from the fitting 1. The sealing member 3 is formed as an annular ring.

The retainer 4 (as may also be referred to as a 'clip') is depicted in FIG. 1 between the aforementioned sealing member 3 and a manifold connector body 5. The retainer 4 serves to secure the fitting 1 and the connector body 5 together. The retainer 4 is formed as a semi-annular member. More specifically, the retainer 4 includes an annular portion 4a which forms a partial circle. The annular portion 4a culminates in a first terminal portion (a first end) 4b and a second terminal portion (a second end) 4c. The first terminal portion 4b and the second terminal portion 4c are directly opposed to each other in orientation. The first terminal portion 4b and the second terminal portion 4c are spaced from each other such that a gap exists, i.e., the terminal portions 4b and 4c do not contact each other. The first terminal portion 4b and the second terminal portion 4c are arranged at a top portion of the annular portion 4a, such that the gap is positioned above a top surface of the fitting 1. The outer circumference of the retainer 4 exceeds that of the fitting 1.

Each of the first and second terminal portions 4b, 4c are provided with a tapered section 4d. The tapered section 4d is an inclined section of the retainer 4. In contrast to the annular construction defining the portions of the retainer 4 other than the first and second terminal portions 4b, 4c, the tapered section 4d has a linear incline so as to slope downward toward the edge of the terminal portion 4b, 4c. Owing to the linear inclination of the tapered section 4d, each of the first and second terminal portions 4b, 4c is provided with a sloped face 4e.

As mentioned above, the retainer 4 acts to clip the manifold connector body 5 and fitting 1 together. To that end, the retainer 4 is structured to be inserted within the body 5, which is discussed below.

Referring again to FIG. 1, the body 5 is depicted at an opposite end from the fitting 1. The body 5 includes an interface portion 5g at a first side closest to the fitting 1. The body 5 further includes a cap portion 5f at a second side opposite to the first side and distal to the fitting 1. The body 5 includes a raised diameter portion 5e between the interface portion 5g and the cap portion 5f. A groove 7 is formed in the raised diameter portion 5c and extends around the circumference of the raised diameter portion 5c, and is proximate to the cap portion 5f. The retainer 4 encircles at least part of the body 5.

The raised diameter portion 5e includes a plurality of recesses which are configured to align with the mating tabs 2a-2d discussed above. More specifically, the plurality of recesses include recess 5a, 5b, for example. The recess 5a is configured to accommodate the mating tab 2a, and the recess 5b is configured to accommodate the mating tab 2b. Further, the body 5 includes abutting sections 5c, 5d. That is, each recess 5a, 5b, is contoured so as to receive the respective mating tabs 2a, 2b inside the recess.

The abutting sections include an abutting section 5c against which the mating tab 2c is configured to abut, and an abutting second 2d against which the mating tab 2d is configured to abut. More particularly, when the fitting 1 is assembled with the body 5, the mating tabs 2c, 2d are positioned such that undersides of each tab 2c, 2d align with upper sides of the abutting sections 5c, 5d so as to have frictional contact with the respective abutting sections 5c, 5d.

The abutting sections 5c, 5d protrude so as to extend past the raised diameter portion 5c in an axial direction. The abutting sections 5c, 5d are orthogonal to the recessed portions 5a, 5b. The portions of the body 5 that define the recessed portions 5a, 5b and abutting sections 5c, 5d are tabs 6 which are configured to maintain respective tabs 2 of the fitting 1 in position. More specifically, mating tabs 6a, 6b, 6c, 6d are provided at 90° increments with respect to the central axis of the body 5. That is, the tabs are arranged at equal intervals. Each mating tab 6a-6d is formed as a wedge-shaped piece having an outer edge that corresponds to an outer circumference of the raised diameter portion 5c.

Figure 2:
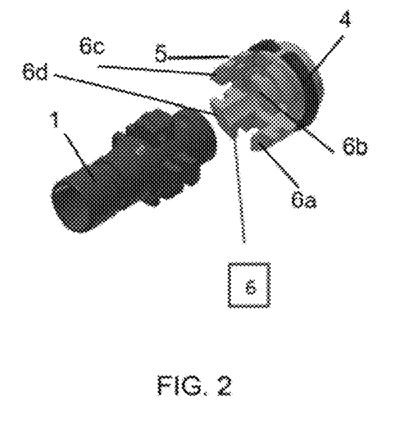
FIG. 2 is an exploded view showing components illustrated in FIG. 1 as assembled together according to one or more assembly steps.

Turning to FIG. 2, FIG. 2 depicts certain aforementioned components illustrated in FIG. 1 which are assembled together according to one or more assembly steps. More particularly, FIG. 2 depicts the fitting 1, in addition to an assembly of the retainer 4 with the body 5. As a first exemplary assembly step, the retainer 4 is inserted over and past the recessed portions 5a, 5b and the abutting sections 5c, 5d. As seen in FIG. 2, the retainer 4, when assembled with the body 5 as described above, is positioned on the cap portion 5f proximate to the distal end of the body 5. The retainer 4 is offset from the raised diameter portion 5c.

Figure 3:
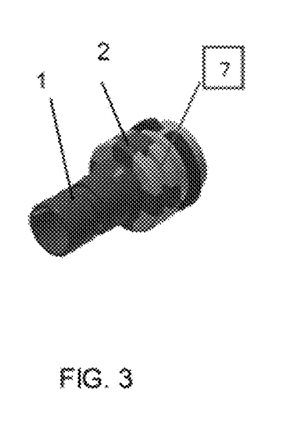
FIG. 3 is an exploded view showing components illustrated in FIG. 1 as assembled together according to one or more additional assembly steps.

Referring to FIG. 3 is an exploded view showing components illustrated in FIG. 1 as assembled together according to one or more additional assembly steps. More particularly, FIG. 3 depicts an assembly of components in accordance with a second exemplary assembly step. As shown in FIG. 3, the fitting 1, the body 5, and the retainer 4 are assembled together. The seal 3 is inserted in the fitting 1 so as to be accommodated entirely inside the fitting 1. Next, the fitting 1 is inserted into the body 5, such that the tabs 2a-2d are aligned respectively with the recessed portions 5a, 5b and abutting sections 5c, 5d. In this manner, the tabs 2a-2d of the fitting 1 respectively interlock (i.e., engage with) the mating tabs 6a-6d of the body 5.

Figure 4:
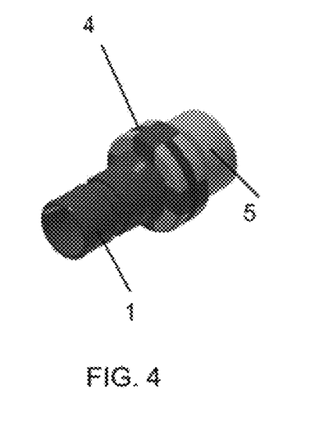
FIG. 4 is an exploded view showing components illustrated in FIG. 1 as assembled together according to one or more further assembly steps.

Referring to FIG. 4, FIG. 4 is an exploded view showing components illustrated in FIG. 1 as assembled together according to one or more further assembly steps. More particularly, FIG. 4 depicts an assembly of the fitting 1, the body 5, and the retainer 4 according to a third exemplary assembly step. As indicated above, the retainer 4 is assembled with the body 5 according to a prior assembly step such that the retainer 4 is positioned on the cap portion 5f. After the fitting 1 is inserted into the body 5, the retainer 4 is moved toward the raised diameter portion 5c and into the groove 7, which extends continuously around the body 5. For example, the retainer 4 may be moved by manually sliding the retainer 4 into the groove 7. When the retainer 4 is slid into the groove 7, the retainer 4 is positioned so as to be flush with the raised diameter portion 5c. The terminal portions 4b, 4c of the retainer 4 are positioned so as to sit inside the mating tabs 2a, 2b of the fitting 1.

Figure 5A:
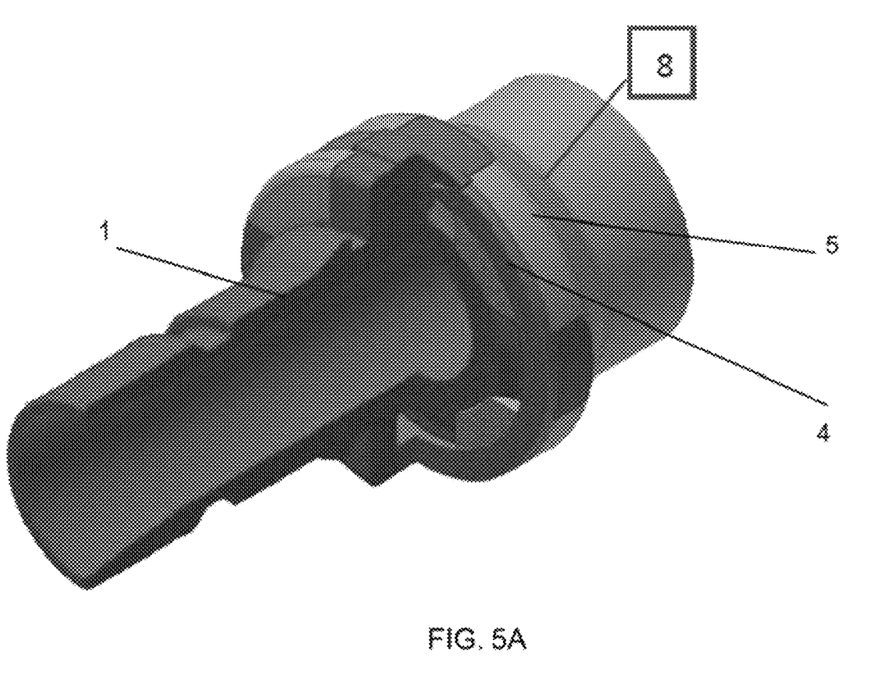
FIG. 5A is a quarter section view illustrating a portion of the system shown in FIG. 1.

FIG. 5A is a quarter section view illustrating a portion of the system shown in FIG. 1. As shown in FIG. 5A, when the fitting 1 is assembled with the body 5 and the retainer 4, the tabs 2a-2d of the fitting 1 respectively interlock (i.e., engage with) the mating tabs 6a-6d of the body 5. A ramped section 8 of the raised diameter portion 5c is disposed between the cap portion 5f and the interface portion 5g. The interlocking tabs enhance the structural integrity of the system. Furthermore, the tabs eliminate a rotational degree of freedom for the connection between the fitting 1 and the body 5. In this manner, the stability of the system is improved, and the risk of leakage due to a loose connection is mitigated.

In addition to the above-mentioned benefits, the retainer 4 beneficially impedes the fitting 1 from moving axially, further alleviating the risk of a loose or otherwise faulty connection. In addition, the sealing member 3, which is positioned within the fitting 1, provides a watertight seal within the inner surface of the body 5. Further, the ramped portion 8 allows for the retainer 4 to be easily installed. The retainer 4 is inserted onto the body 5, and is slid over the ramped portion 8. The diameter of the body 5 is increased gradually on the ramped portion 8, which allows the retainer 4 to expand to the diameter of the tabs 2a, 2b just before falling into the groove 7.

Figure 5B:
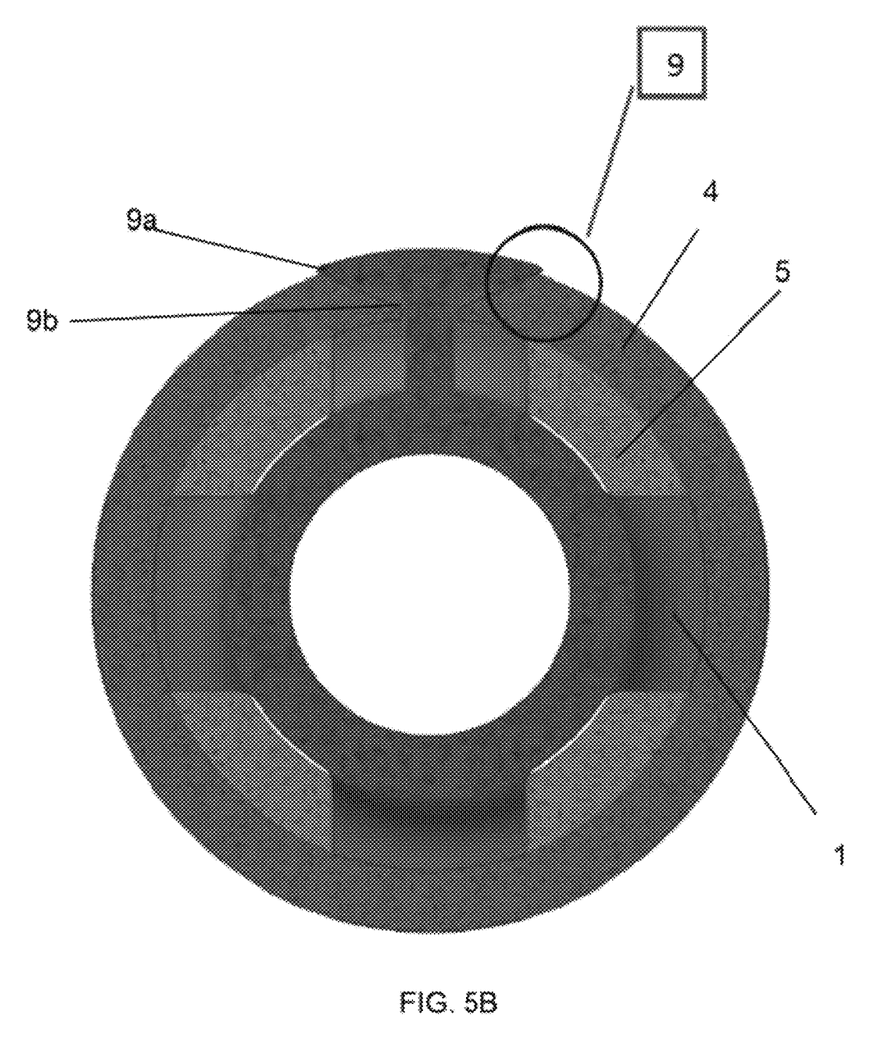
FIG. 5B is a detail section view illustrating a portion of the system shown in FIG. 5A.

FIG. 5B is a detail section view illustrating a portion of the system shown in FIG. 5A. As seen in FIG. 5B, the fitting 1 is provided with a lip section 9 at the terminal portions of each of the mating tabs 2a, 2b. The lip section 9 is an elevated section formed with an overhanging section 9a at one end that extends, in the radial direction, so as to project beyond a tapered section 9b at another end. According to at least one exemplary implementation, the lip section 9 may be formed as a triangular wedge, where the overhanging section 9a corresponds to a wide base of a triangle, and the tapered section 9b corresponds to the vertex. The lip section 9 is sandwiched between the terminal portions 4b, 4c.

The lip section overlaps one or both of the terminal portions 4b, 4c of the retainer 4. Thus, when viewed from above, the terminal portions 4b, 4c of the retainer 4 are not visible because they are completely concealed by the lip section 9. The assembly of the foregoing components is such that the fitting 1, body 5, and retainer 4 cannot be easily disassembled without employing one or more tools. Thus, the assembly is less susceptible to tampering. Further, the concealment of one or both of the terminal ends 4b, 4c by the lip section 9 serves as an indication that the assembly has not been tampered with, whereas it is an indication that the assembly may be misaligned or otherwise improper, or tampered with, if the terminal ends 4b, 4c are visible.

The exemplary implementations described above allow modular construction of multiport tees to accommodate different configurations. More particular, the above-mentioned implementations may be employed to construct 2 port systems, 3 port systems, 4 port systems, 5 port systems, and multiples thereof. In particular, discrete assemblies of the fitting 1, body 5, and retainer 4 may be constructed and joined together so as to achieve a system having a desired number of ports.

Further still, each assembly of the fitting 1, body 5, and retainer 4 may be oriented in a desired orientation, such that respective modular sections may be aligned in 90° iterations depending on the desired direction of the port. For example, a first modular section may be constructed with two ports each at a first angle, and second modular section may be connected to the first section and constructed with two ports at a right angle to the first angle. Accordingly, a fluid distribution system (e.g., a water distribution system) may be constructed with a plurality of the fitting 1 (e.g., a tubular member), the retainer 4, and the body 5. For example, a water distribution system may be constructed with four modular sections.

Figure 6A:
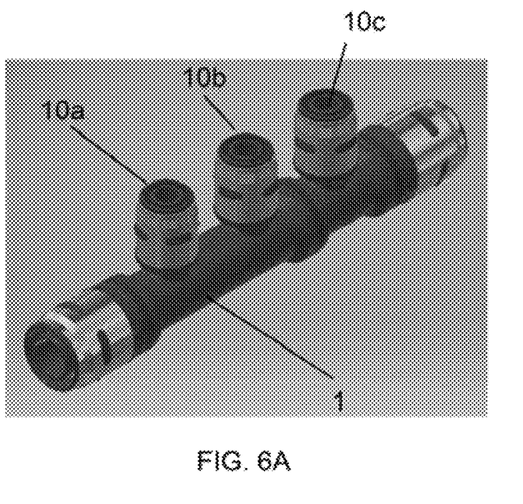
FIG. 6A is a perspective view illustrating a three-port system according to an exemplary implementation.
Figure 6B:
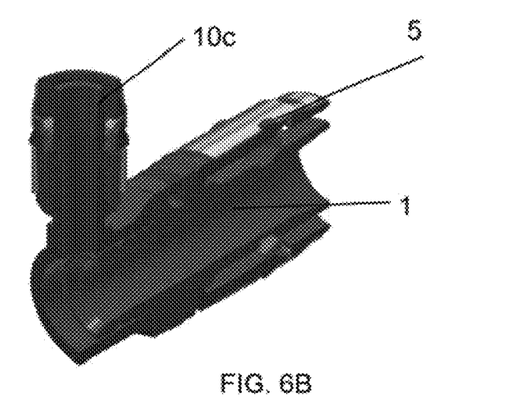
FIG. 6B is a cross-section view illustrating a portion of the system shown in FIG. 6A.

FIG. 6A is a perspective view illustrating a three port system according to an exemplary implementation. As shown in FIG. 6A, the three port system includes ports 10a, 10b, 10c which are open ports and which are arranged along a same side of a fitting 1. The fitting 1 is joined or coupled to the body 5 in the manner described above. FIG. 6B is a cross-section view illustrating a portion of the system shown in FIG. 6A. More particularly, FIG. 6B illustrates a cross-section of the port 10c and the fitting connection between the fitting 1 and body 5. As seen in FIGS. 6A-6B, the portion of the assembly including port 10c is a modular section that may be readily connected to one or more other modular sections.

Figure 7A:
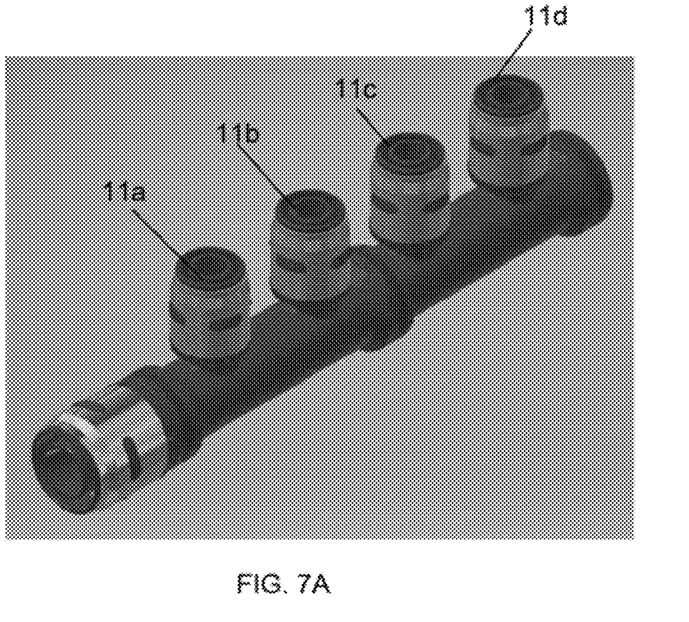
FIG. 7A is a perspective view illustrating a four-port system according to an exemplary implementation.
Figure 7B:
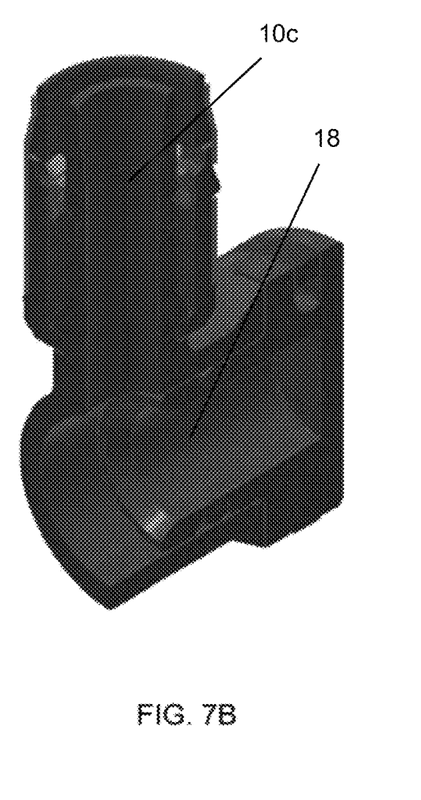
FIG. 7B is a cross-section view illustrating a first portion of the system shown in FIG. 7A.
Figure 7C:
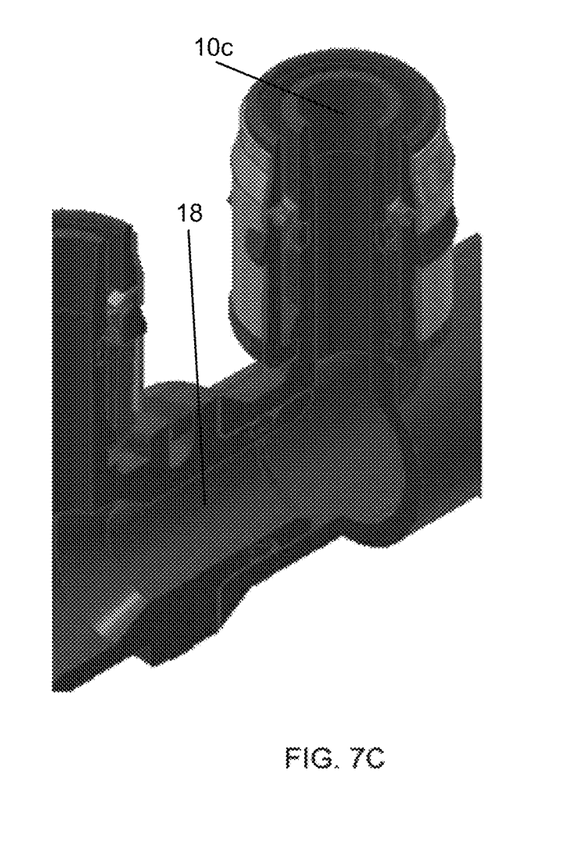
FIG. 7C is a cross-section view illustrating a second portion of the system shown in FIG. 7A.

FIG. 7A is a perspective view illustrating a four port system according to an exemplary implementation. Four ports 11a-11d are arranged in linear order and have a same orientation along the longitudinal direction of the system. The ports 11a-11d are in a closed state. FIG. 7B is a cross-section view illustrating a first portion of the system shown in FIG. 7A. More particularly, FIG. 7B illustrates an area 18 corresponding to a cross-sectional area of a portion including the port 11d end cap connection (a cross section of the end cap). FIG. 7C is a cross-section view illustrating a second portion of the system shown in FIG. 7A. The portion shown in FIG. 7C is a cross-section of the body section connection between fitting 1 and body 5.

Figure 8:
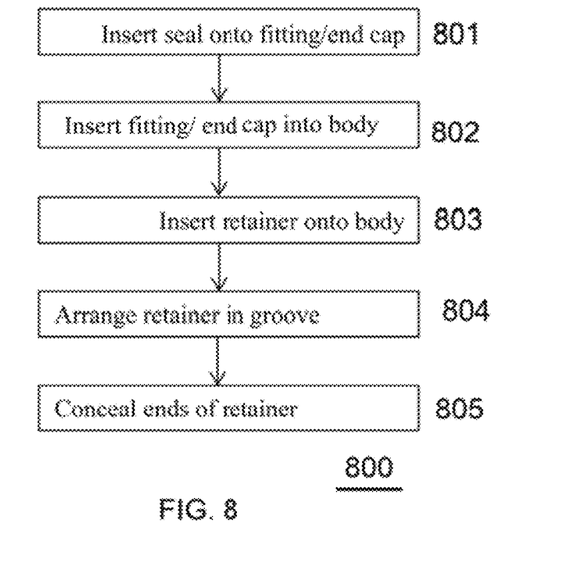
FIG. 8 is a process diagram illustrating a method according to an exemplary implementation.

FIG. 8 is a process diagram illustrating a method 800 according to an exemplary implementation. The method 800 includes inserting the sealing member 3 into the fitting 1 (801). In some embodiments, the sealing member 3 may be fitted into an end cap, such as the end cap shown in FIG. 7B. Next, the fitting 1 (or the end cap) is inserted into the body 5 (802). The retainer 4 is assembled such that the retainer circumscribes at least a part of a cylindrical end of the body 5, and is flush with the outer surface of the body (803). As seen in FIG. 1 above, the body has a groove 7 and first and second tabs spaced with respect to the sealing member 3 in a lateral direction of the body 5.

The method 800 further includes arranging the retainer 4 so as to be aligned with the ramped portion 8 and slid over the ramped portion 8. Once retainer 4 is slid over the ramped portion 8, the retainer 4 is guided into the groove 7 (804). The retainer has a tapered first terminal portion 4b and a tapered second terminal portion 4c which respectively contact the first and second tabs 2a, 2b. The tapered terminal portions 4b, 4c are positioned so as to be concealed by a lip section 9 (805). The retainer prevents axial motion of the fitting when the retainer is inserted into the groove, as mentioned above.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that to the extent that the present disclosure refers to certain preferred implementations, various other implementations and variants may occur to those skilled in the art, which are within the scope and spirit of the disclosure, and such other implementations and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A method of assembling a manifold, comprising:
positioning a retainer to engage with a body of a manifold such that the retainer circumscribes at least a part of a cylindrical end of the body, the body having a groove;
inserting a fitting into the body, the fitting having first and second tabs spaced from a seal in a lateral direction of the fitting, the fitting comprising a lip;
arranging the retainer in the groove, the retainer having a tapered first terminal portion and a tapered second terminal portion which respectively contact the first and second tabs of the fitting when the retainer is arranged in the groove of the body and is flush with the fitting, the first terminal portion and the second terminal portion being disposed underneath the lip so as to contact an underside of the lip; and
preventing axial motion of the fitting when the retainer is inserted into the groove.

2. The method of claim 1, wherein the fitting further comprises third and fourth tabs, wherein each of the tabs is spaced at equal intervals around a circumference of the fitting.

3. The method of claim 1, wherein the first tapered terminal portion is opposed to the second tapered terminal portion.

4. The method of claim 1, wherein the first terminal portion and the second terminal portion are spaced from each other.

5. The method of claim 1, further comprising positioning the seal within the body.

6. The method of claim 1, wherein arranging the retainer into the groove comprises securing the retainer in place.

7. The method of claim 1, wherein a portion of the fitting is sandwiched between the first and second terminal portions.

8. The method of claim 1, wherein the fitting comprises at least one elevated portion which overlaps the first terminal portion or the second terminal portion.

9. The method of claim 8, wherein the at least one elevated portion conceals the first terminal portion or the second terminal portion.

10. A method of assembling a manifold, comprising:
positioning a semi-annular retainer to engage with a body of a manifold such that the retainer circumscribes at least a part of a cylindrical end of the body, the body having a groove;
inserting a fitting into the body, the fitting having first and second tabs spaced from a seal in a lateral direction of the fitting;
arranging the retainer in the groove, the retainer having a tapered first terminal portion and a tapered second terminal portion which respectively contact the first and second tabs of the fitting when the retainer is arranged in the groove of the body and is flush with the fitting, and the retainer being aligned coaxially with both the fitting and the body; and
preventing axial motion of the fitting when the retainer is inserted into the groove.

11. The method of claim 10, wherein the fitting further comprises third and fourth tabs, wherein each of the tabs is spaced at equal intervals around a circumference of the fitting.

12. The method of claim 10, wherein the first tapered terminal portion is opposed to the second tapered terminal portion.

13. The method of claim 10, wherein the first terminal portion and the second terminal portion are spaced from each other.

14. The method of claim 10, further comprising positioning the seal within the body.

15. The method of claim 10, wherein arranging the retainer into the groove comprises securing the retainer in place.

16. The method of claim 10, wherein a portion of the fitting is sandwiched between the first and second terminal portions.

17. The method of claim 10, wherein the fitting comprises at least one elevated portion which overlaps the first terminal portion or the second terminal portion.

18. The method of claim 17, wherein the at least one elevated portion conceals the first terminal portion or the second terminal portion.

* * * * *